No. 639,015. Patented Dec. 12, 1899.
O. E. BRAY.
FEED CUTTER.
(Application filed Dec. 15, 1898.)

(No Model.)

WITNESSES
Chas. Wisner
John N. Goodrich

INVENTOR
Oscar E. Bray
By Parker & Burton
Attorneys.

UNITED STATES PATENT OFFICE.

OSCAR E. BRAY, OF TORONTO JUNCTION, CANADA, ASSIGNOR OF ONE-HALF TO EDWARD G. E. FFOLKES, OF TORONTO, CANADA.

FEED-CUTTER.

SPECIFICATION forming part of Letters Patent No. 639,015, dated December 12, 1899.

Application filed December 15, 1898. Serial No. 699,296. (No model.)

*To all whom it may concern:*

Be it known that I, OSCAR E. BRAY, a citizen of Canada, residing at Toronto Junction, county of York, Province of Ontario, Canada, have invented a certain new and useful Improvement in Feed Cutters and Shredders; and I declare the following to be a full, clear, and exact description of the invention, such as will enable others skilled in the art to which it pertains to make and use the same, reference being had to the accompanying drawings, which form a part of this specification.

This invention relates to feed-cutters and pneumatic conveyers, and has for its object a pneumatic-conveyer attachment to be applied to feed-cutters for the purpose of receiving and carrying the cut feed from the knives to a place of storage.

The machine is especially adapted for preparing and conveying to a place of storage the class of cut feed which is used in making silos; but it may be used with any class of material, whether the material be intended for immediate use or for storage.

Figure 1:
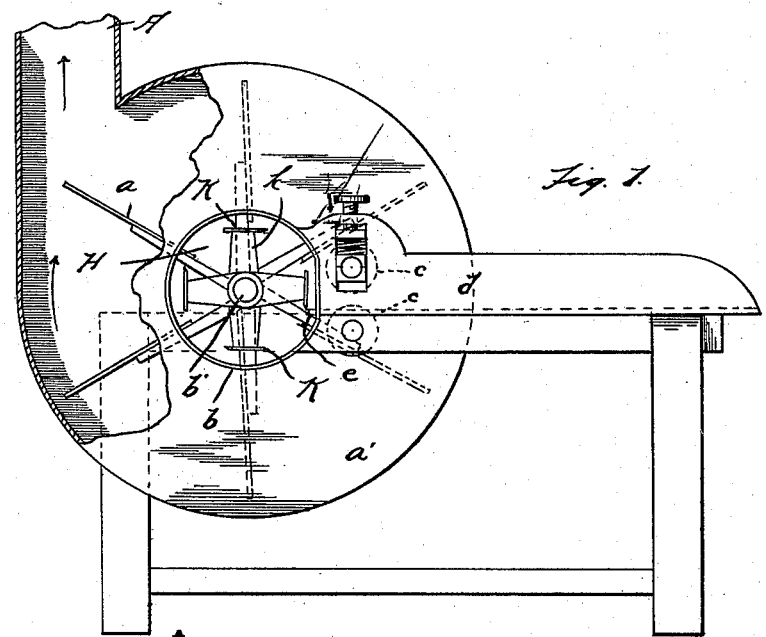
Figure 3:
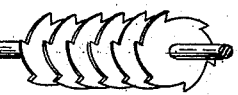
Figure 2:
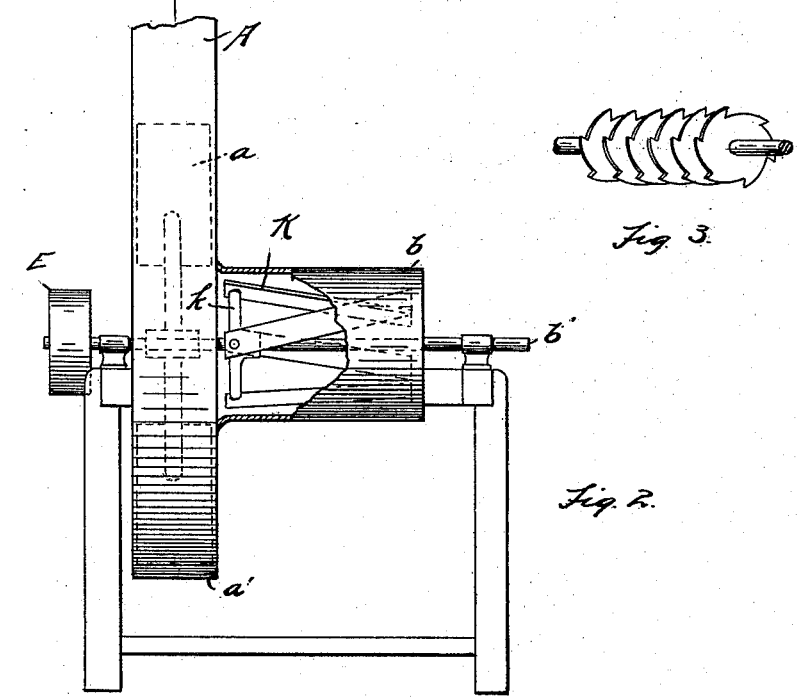

In the drawings, Figure 1 is a side elevation of the machine with part of the casing broken away. Fig. 2 is a rear elevation. In this figure a part of the casing is broken away. Fig. 3 shows shredding-knives.

The cutting part of the machine consists of a number of knives K K, mounted on the ends of radial arms $k$, that radiate from a shaft $b'$. The knives K revolve in a cylindrical casing $b$ and shear against a shearing-blade $e$, that lies behind feed-rolls $c\ c$ and at the inner end of a feed-passage $d$. The cylindrical casing $b$ is open to the air at one end and at the other end opens into the eye of a fan-casing $a'$. Within the fan-casing, mounted on the same shaft on which the knives are mounted, is a fan $a$. The fan-casing $a'$ has an outlet A, which is used as the conductor-pipe for the transportation of the cut product. On the same shaft with the knives of the fan is mounted a driving-pulley E, through which motion is given to the fan $a$ and cutter-knives K K from any suitable source of power.

In this machine the only openings through which air can pass into the fan are at the end of the cylindrical knife-case $b$ and the nearly-closed passage between the feed-rolls C C. This latter passage is practically entirely closed when the machine is in operation. Whether air enters through the passage or not is, however, immaterial, because all the air is directed finally through the one opening into the eye of the fan, which is the most suitable place to produce the best results. The knives K K are arranged spirally with reference to the shaft $b'$, with their cutting-edges inclined toward the eye of the fan and cut on a line parallel with the shaft, delivering the cut food directly into the current of moving air that is passing into the fan from the inlet H, and the knives constantly rotating serve to throw up from the bottom of the knife-cylinder the particles of cut food, so that they cannot accumulate and clog up the air-passage, and the inclination of the leading edges of said knives has a tendency to move the cut food toward the eye of the fan.

I also use the machine with shredding-knives, such as are shown in Fig. 3. With either form of knife the machine can be used either alone or in conjunction with corn-husking machines, which separate the corn and the husks from the stalks and deliver the stalks to the cutter or shredder to be treated.

Having thus described my invention, what I claim is—

1. In a feed-cutter the combination of a centrifugal fan, $a\ a'$, a cylindrical casing, $b$, said casing having its axis in line with the axis of the casing of said fan, the casing, $b$, opening at one end into the eye of said fan-casing and at the other end to the open air, the shaft of said fan extending axially into the casing, $b$, and having mounted thereon knives, K K, adapted to cut on a line parallel to said shaft, a peripheral opening in the casing, $b$, through which the apparatus may be fed, an edge along said peripheral opening adapted to act in conjunction with said knives to cut the feed, and feed-rollers, C C, located outside of the casing, $b$, and adapted to feed the apparatus, and to obstruct the entrance of the air with the ingoing feed, through said peripheral opening, substantially as described.

2. In a feed-cutter the combination of a centrifugal fan, $a\ a'$, a cylindrical casing, $b$, said casing having its axis in line with the axis of the casing of said fan, the casing, $b$, opening at one end into the eye of said fan-casing, and at the other end to the open air, the shaft of said fan extending axially into the casing, b, and having mounted thereon knives, K K, adapted to cut on a line parallel to said shaft, said knives having a spiral shape with their edges inclined longitudinally toward the eye of said fan, a peripheral opening in the casing, b, through which the apparatus may be fed, an edge along said peripheral opening adapted to act in conjunction with said knives to cut the feed, feed-rollers, C C, located outside of the casing, b, and adapted to feed the apparatus, and to obstruct the entrance of the air with the ingoing feed, through said peripheral opening, substantially as described.

In testimony whereof I sign this specification in the presence of two witnesses.

OSCAR E. BRAY.

Witnesses:
 CHARLES F. BURTON,
 MARION A. REEVE.